United States Patent
Shimpi et al.

(10) Patent No.: US 12,260,176 B2
(45) Date of Patent: Mar. 25, 2025

(54) SYSTEM AND METHOD FOR EXTRACTING ISSUES BASED ON TROUBLE TICKET MINING

(71) Applicant: Tata Consultancy Services Limited, Mumbai (IN)

(72) Inventors: Vikrant Vikas Shimpi, Pune (IN); Maitreya Natu, Pune (IN); Monika Bhave, Pune (IN); Siddartha Kshirsagar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 301 days.

(21) Appl. No.: 17/936,822

(22) Filed: Sep. 29, 2022

(65) Prior Publication Data
US 2023/0108067 A1   Apr. 6, 2023

(30) Foreign Application Priority Data
Oct. 6, 2021 (IN) .............................. 202121045391

(51) Int. Cl.
G06F 40/279   (2020.01)
G06F 16/26    (2019.01)

(52) U.S. Cl.
CPC ............ *G06F 40/279* (2020.01); *G06F 16/26* (2019.01)

(58) Field of Classification Search
CPC ..... G06F 40/279; G06F 16/26; G06Q 30/016; G06Q 10/10; H04L 41/5074
See application file for complete search history.

(56) References Cited

U.S. PATENT DOCUMENTS

| | | | |
|---|---|---|---|
| 7,069,234 B1 * | 6/2006 | Cornelius | G06Q 40/00 705/26.8 |
| 7,403,901 B1 * | 7/2008 | Carley | G16Z 99/00 705/2 |

(Continued)

OTHER PUBLICATIONS

Zhou, Wubai et al., "STAR: A System for Ticket Analysis and Resolution", Proceeding of 23rd ACM SIGKDD Conference on Knowledge Discovery and Data Mining, Date: Aug. 2017, Publisher: Research Gate, https://www.researchgate.net/publication/318373831_STAR_A_System_for_Ticket_Analysis_and_Resolution/link/5c2b7d3aa6fdccfc7076257a/download.

(Continued)

*Primary Examiner* — Michael N Opsasnick
(74) *Attorney, Agent, or Firm* — FINNEGAN, HENDERSON, FARABOW, GARRETT & DUNNER LLP

(57) ABSTRACT

A trouble ticket may contain various details of an observed issue and information of the actual issue which is hidden in the trouble ticket description along with other information. Embodiments herein describe an algorithm of algorithms (AoA) layer approach for extracting issues from trouble ticket descriptions. The method identifies the type of trouble ticket whether it is machine generated or user generated trouble tickets and accordingly selects the appropriate algorithm for issue extraction. It selects a relevant algorithm for the machine generated trouble tickets, and user generated trouble tickets based on trouble ticket data properties, historical performance, and a user feedback. It identifies right mix of columns from a service catalog to be used for matching based on presence of weighted keywords in the input data and identifies high-weighted keywords from input data descriptions and compares them with selected columns from catalog to generate accurate matches with their similarity score.

15 Claims, 3 Drawing Sheets

(56) References Cited

U.S. PATENT DOCUMENTS

| | | | |
|---|---|---|---|
| 9,317,829 | B2 | 4/2016 | Anand et al. |
| 10,229,416 | B2 | 3/2019 | Shimpi et al. |
| 2006/0059253 | A1* | 3/2006 | Goodman .............. G06Q 10/10 709/223 |
| 2015/0254679 | A1* | 9/2015 | te Booij ............. G06Q 30/0201 705/7.29 |
| 2017/0235848 | A1* | 8/2017 | Van Dusen ............ G07C 13/00 705/12 |
| 2018/0260760 | A1* | 9/2018 | Srivastava ....... G06Q 10/06313 |
| 2019/0349321 | A1* | 11/2019 | Cai ........................ G06N 3/006 |
| 2023/0108067 | A1* | 4/2023 | Shimpi .................. G06Q 10/10 704/9 |

OTHER PUBLICATIONS

Beneker, Daniel et al., "Using Clustering for Categorization of Support Tickets", Computer Science, Date: 2017, Publisher: Semantic Scholar, http://ceur-ws.org/Vol-1917/paper10.pdf.

Roy, Suman et al., "Clustering and Labeling IT Maintenance Tickets", Service-Oriented Computing, Date: Oct. 2016, pp. 829-845, Publisher: Springer, https://link.springer.com/content/pdf/10.1007/978-3-319-46295-0_58.pdf.

* cited by examiner

SYSTEM AND METHOD FOR EXTRACTING ISSUES BASED ON TROUBLE TICKET MINING

CROSS-REFERENCE TO RELATED APPLICATIONS AND PRIORITY

This U.S. patent application claims priority under 35 U.S.C. § 119 to Indian Application number 202121045391, filed on Oct. 6, 2021. The entire content of the abovementioned application is incorporated herein by reference.

TECHNICAL FIELD

The disclosure herein generally relates to the field of issue extraction, more particularly, to a system and method for extracting information technology (IT) related issues by mining trouble tickets.

BACKGROUND

Information technology (IT) systems of today's enterprises are continuously monitored and managed by a team of resolvers. Any issue in an IT system is reported in the form of trouble tickets. A trouble ticket may contain various details of an observed issue, such as reporting time, system-of-origin, and severity. In addition, the trouble ticket may also include information of the actual issue which is hidden in the trouble ticket description along with other information. Knowledge of the actual issue enables the team of resolvers to improvise cost and quality of operations.

Existing techniques heavily rely on trouble ticketing systems to manage and streamline the process of issue resolution. Whenever any end-user of an organization encounters any event that interrupts their day-to-day workflow, trouble tickets are raised in the trouble ticketing software, where they are categorized, prioritized, and assigned to different agents, according to the skillset of resolver and type of issue raised. Faster resolution is possible when the issue is correctly identified and mapped to right agent for resolution. The trouble tickets come with a resolve service level agreement (SLA), which typically denotes the timeline till when resolution should be provided. Any violation of these SLA directly leads to financial penalties, outages, loss of business, and poor customer experience.

Generally, trouble tickets generated by alerting tools are standardized in their structure, but they contain technical jargon and are not well-formed English sentences and are heavily parameterized. Trouble tickets generated by humans are non-standardized, redundant, ambiguous, have typos, and at times are verbose.

SUMMARY

Embodiments of the disclosure present technological improvements as solutions to one or more of the above-mentioned technical problems recognized by the inventors in conventional systems. For example, in one embodiment, a system and method for extracting information technology (IT) related issues by mining trouble tickets is provided.

In one aspect, a processor-implemented method for extracting information technology (IT) related issues by mining trouble tickets is provided. The processor-implemented method includes one or more steps such as receiving a plurality of trouble tickets representing one or more IT related issues, and inferring description of the machine generated, and the user generated trouble tickets based on language variations, Part of Speech (PoS) tagging, sentence correctness and completeness, and presence of non-dictionary terms. Further, the method comprising identifying patterns of descriptions of the plurality of trouble tickets by understanding domain-specific parameters from the plurality of trouble tickets, clustering the machine generated, and the user generated trouble tickets separately based on the identified patterns of the descriptions of the plurality of trouble tickets, selecting one or more techniques for the machine generated and user generated trouble tickets based on data properties, historical performance, and user feedback on each of the plurality of trouble tickets, identifying one or more columns from a predefined service catalog based on the pattern matching technique, comparing description of the plurality of the trouble tickets having weighted keywords with the identified one or more columns from the service catalog for matching with a similarity score, labelling descriptions of the machine generated trouble tickets using the text similarity matching technique based extraction, aggregating the labelled descriptions of the machine generated trouble ticket and the descriptions of the user generated trouble tickets to obtain trouble ticket descriptions with labels or without labels, and learning one or more issues of the machine generated trouble tickets from the obtained trouble ticket descriptions with labels.

In another aspect, a system for extracting information technology (IT) related issues by mining trouble tickets is provided. The system includes an input/output interface configured to receive a plurality of trouble tickets representing one or more information technology (IT) related issues. Further, the system is configured to infer description of the machine generated, and the user generated trouble tickets based on language variations, Part of Speech (PoS) tagging, sentence correctness and completeness, and presence of non-dictionary terms, identify patterns of descriptions of the plurality of trouble tickets by understanding domain-specific parameters from the plurality of trouble tickets, cluster the machine generated, and the user generated trouble tickets separately based on the identified patterns of the descriptions of the plurality of trouble tickets, select one or more techniques for the machine generated and user generated trouble tickets based on data properties, historical performance, and user feedback on each of the plurality of trouble tickets, identify one or more columns from a predefined service catalog based on the pattern matching technique, compare description of the plurality of the trouble tickets having weighted keywords with the identified one or more columns from the service catalog for matching with a similarity score, label descriptions of the machine generated trouble tickets using the text similarity matching technique based extraction, aggregate the labelled descriptions of the machine generated trouble ticket and the descriptions of the user generated trouble tickets to obtain trouble ticket descriptions with labels or without labels, and learn one or more issues of the machine generated trouble tickets from the obtained trouble ticket descriptions with labels.

In yet another aspect, one or more non-transitory machine-readable information storage mediums are provided comprising one or more instructions, which when executed by one or more hardware processors causes a method for extracting information technology (IT) related issues by mining trouble tickets. The processor-implemented method includes one or more steps such as receiving a plurality of trouble tickets representing one or more IT related issues, and inferring description of the machine generated, and the user generated trouble tickets based on language variations, Part of Speech (PoS) tagging, sentence correctness and completeness, and presence of non-dictionary terms. Further, the method comprising identifying patterns of descriptions of the plurality of trouble tickets by understanding domain-specific parameters from the plurality of trouble tickets, clustering the machine generated, and the user generated trouble tickets separately based on the identified patterns of the descriptions of the plurality of trouble tickets, selecting one or more techniques for the machine generated and user generated trouble tickets based on data properties, historical performance, and user feedback on each of the plurality of trouble tickets, identifying one or more columns from a predefined service catalog based on the pattern matching technique, comparing description of the plurality of the trouble tickets having weighted keywords with the identified one or more columns from the service catalog for matching with a similarity score, labelling descriptions of the machine generated trouble tickets using the text similarity matching technique based extraction, aggregating the labelled descriptions of the machine generated trouble ticket and the descriptions of the user generated trouble tickets to obtain trouble ticket descriptions with labels or without labels, and learning one or more issues of the machine generated trouble tickets from the obtained trouble ticket descriptions with labels.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The embodiments herein provide a system and method for extraction of IT related issues from trouble tickets using a multi-pronged approach. Many organizations address this problem by providing Interactive Voice Response (IVR) or an on-screen menu to select a problem from a predefined set. This often leads to poor customer experience due to restricted options. It also becomes a tedious task to maintain and update the menu with technology and business changes. Many organizations maintain a catalogue of known issues. They use this catalogue to train their support team or to map to available automation solutions. Thus, instead of blindly mining issues from descriptions, the problem becomes easier to match the descriptions to the known set of issues.

It is observed that the problem can be broken into different sub-problems which are presenting different challenges. Service catalog contains a set of known issues. These issues are defined in a crisp manner such as 'perform password reset or unlock account', or 'resolve Oracle listener down issue', etc. The trouble ticket descriptions are verbose with many extra situational details and different variations such as 'I am not login to application xyz. My account is locked. Please help me unlock the account'. Instead of mining, this becomes a matching problem where expert need to match a predefined set of crisp issue definitions to their verbose and/or varying descriptions.

The embodiments herein solve this problem by developing a weighted set matching technique. The system and method perform text-cleaning to remove parameter variations and lemmatization to address various inflected forms of words. The system and method then do a weighted text matching to look for the presence of a catalog entry or its variations in the description. The matching is done such that more weight is assigned to the key actions and object terms, and their sequence.

Figure 1:
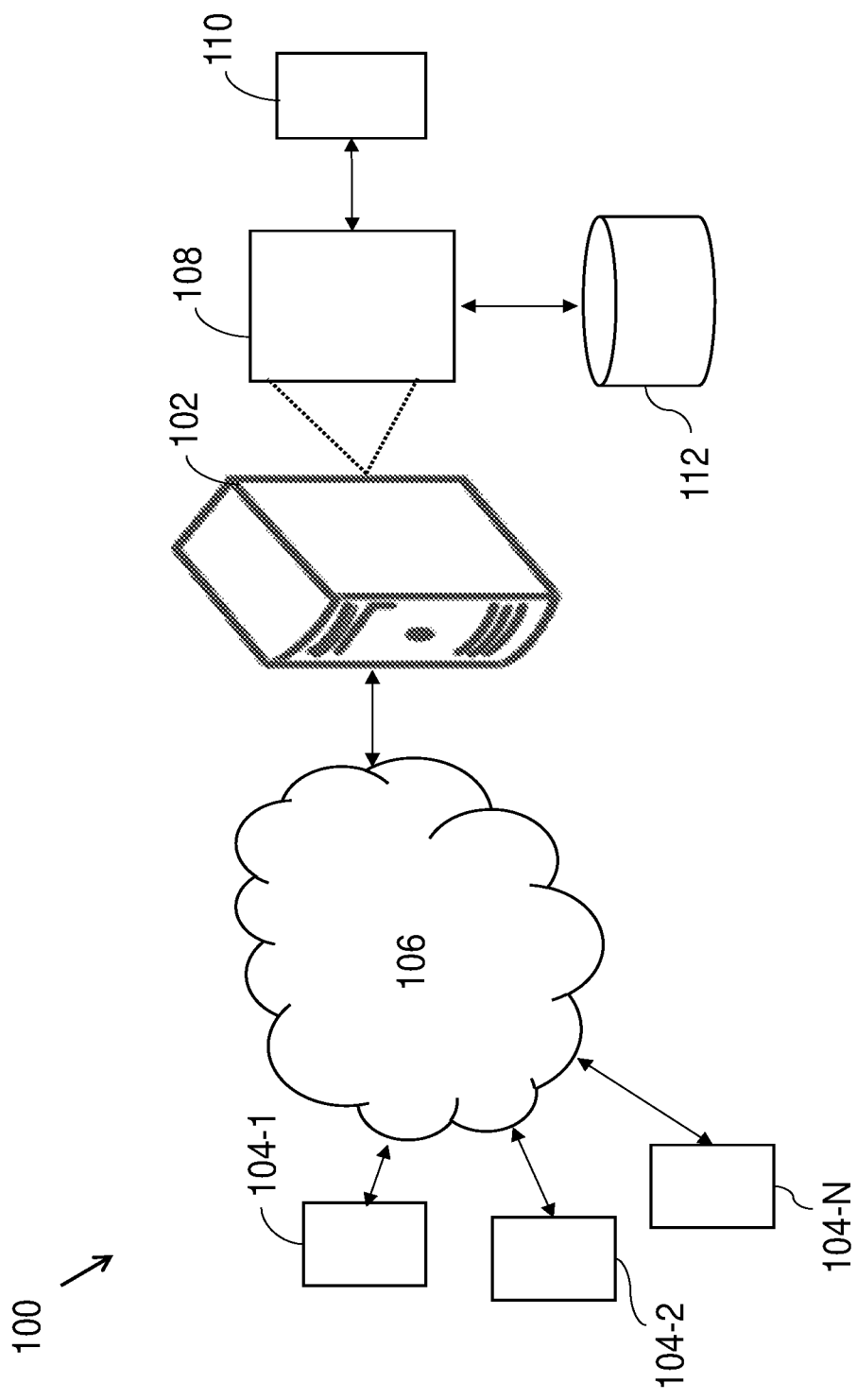
FIG. 1 illustrates a network diagram of a system for extracting information technology (IT) related issues by mining trouble tickets, in accordance with some embodiments of the present disclosure.
Figure 2:
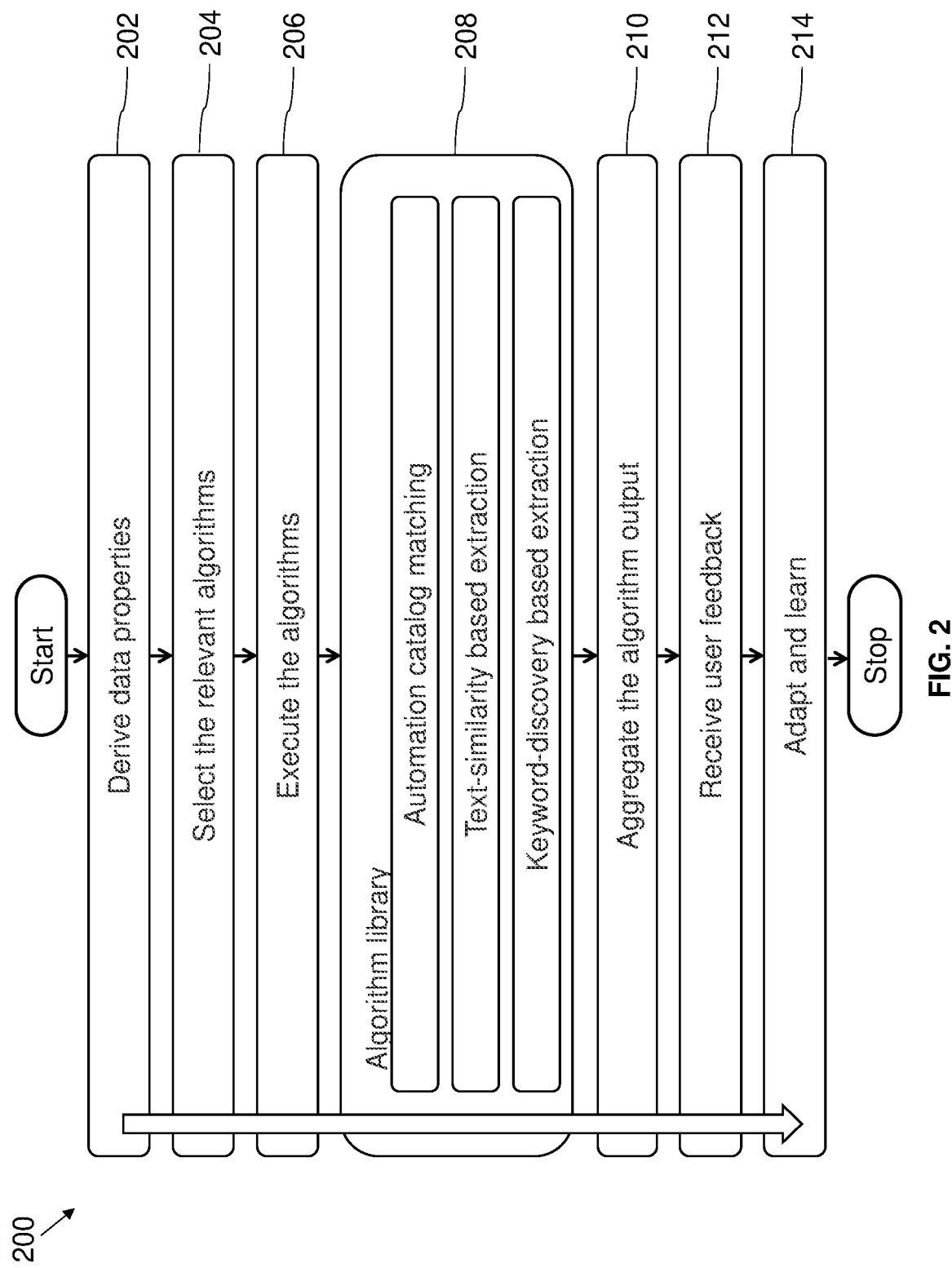
FIG. 2 illustrates a flowchart for issue extraction from trouble tickets using a multi-pronged approach, in accordance with some embodiments of the present disclosure.
Figure 3:
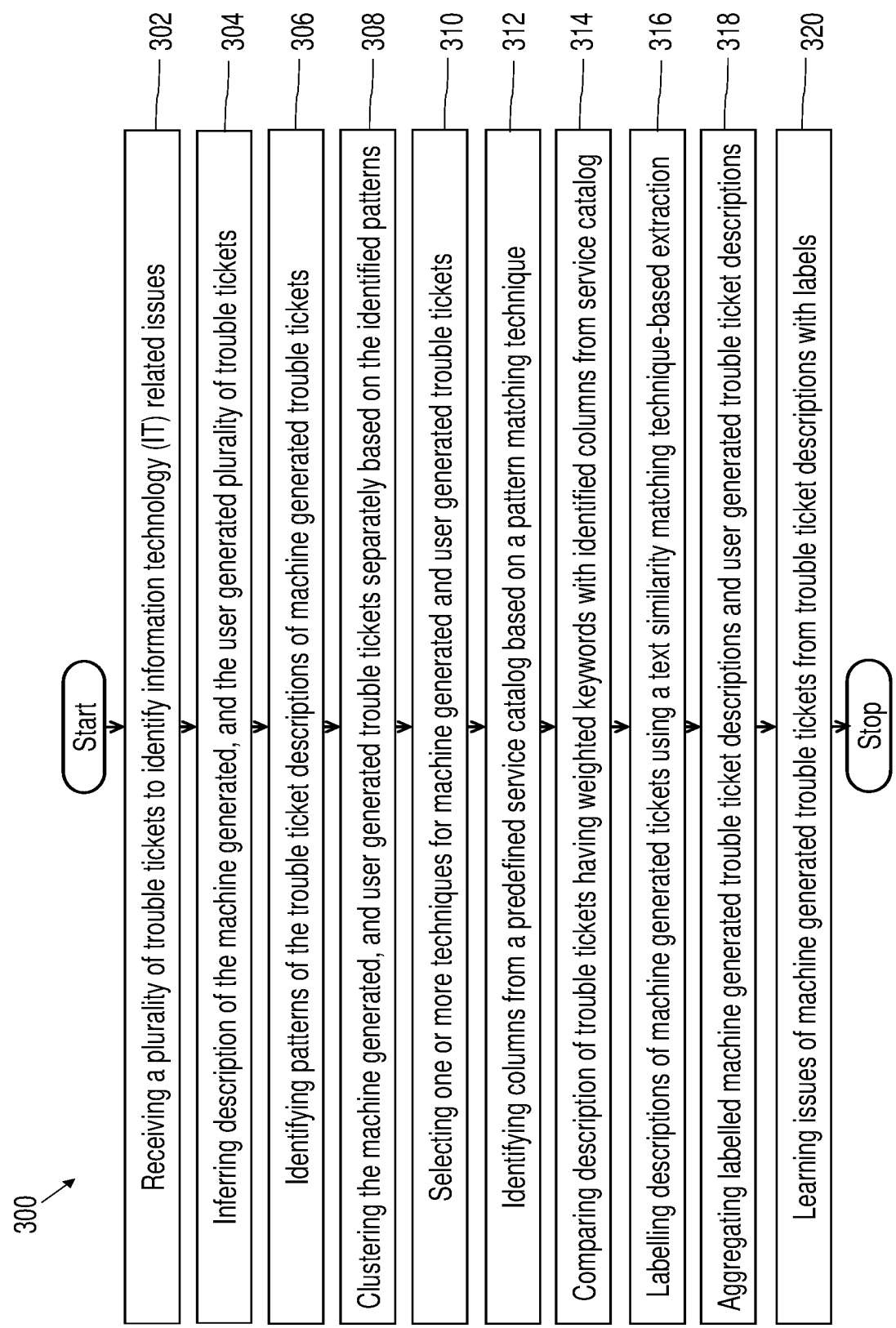
FIG. 3 is a flowchart to illustrate a method for extracting information technology (IT) related issues by mining trouble tickets, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

Referring FIG. 1, wherein the system (100) is configured for extraction of issues from trouble tickets using a multi-pronged approach. The system (100) describes an Algorithm of Algorithms (AoA) layer approach for extracting issues from trouble ticket descriptions. The system (100) identifies the type of trouble ticket whether it is a machine generated or user generated trouble tickets and accordingly selects the appropriate technique for issue extraction.

Although the present disclosure is explained considering that the system (100) is implemented on a server, it may be understood that the system (100) may comprises one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such.

The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links. Further, the system (100) comprising one or more hardware processors (108), a memory (110) in communication with the one or more hardware processors (108) and a database (112).

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

The system (100) is configured to identify machine generated trouble tickets and user generated trouble tickets by clustering the set of trouble ticket descriptions and based on number of clusters, inter-cluster and intra-cluster distance, language variations, Part of Speech (PoS) tagging, sentence correctness and completeness and non-dictionary terms present. Further, the system (100) selects the relevant technique for the machine generated trouble tickets, and user generated trouble tickets based on trouble ticket data properties, historical performance and user feedback and identifying trouble ticket descriptions by matching known issues from a service catalog which comprises annotated issues.

In another embodiment, the system (100) is configured to identify the right mix of columns from the service catalog to be used for matching based on the presence of weighted keywords in the input data and identifies the high-weighted keywords from input data descriptions and compares them with selected columns from catalog to generate accurate matches with their similarity score.

Furthermore, the system (100) is configured to identify and label trouble ticket descriptions in the machine generated trouble tickets using a text similarity based extraction. It includes identifying patterns of the trouble ticket descriptions of machine generated trouble tickets by understanding domain-specific parameters from the trouble tickets, creating cluster of similar descriptions using intra-cluster distance, inter-cluster distance and degree of closeness, and selecting a cluster with highest quality by assessing each cluster with its similarity score, and create cluster labels by selecting weighted n-grams from descriptions within each cluster.

In yet another embodiment, the system (100) is configured to identify and label trouble ticket descriptions in user generated trouble tickets using keyword-discovery based extraction. It includes identify patterns of the trouble ticket descriptions by understanding parameters and jargons from the trouble tickets, cluster ambiguous and verbose user generated descriptions using vectorization by decoding semantics of issues. Further, the system (100) is configured to extract issues from the description by identifying top-k gram keywords within each cluster and creating a subcluster of all those descriptions having those top k-grams keywords, systematically chooses an optimum 'k' value by following a k vs cluster-size matrix. It is to be noted that these steps are performed iteratively until issues are extracted from the description.

In another embodiment, the system (100) is configured to aggregate the labelled machine generated trouble ticket descriptions and user generated trouble ticket descriptions to obtain trouble ticket descriptions with labels or without labels. Further, the system (100) receives user feedback for each labelled machine generated trouble ticket descriptions and user generated trouble ticket descriptions to obtain a representative set of labelled or unlabeled trouble ticket descriptions. Learning the issues of trouble ticket descriptions from the representative set of labelled or unlabeled trouble ticket descriptions.

In yet another embodiment, the system (100) is configured to extrapolate the feedback of each representative issue on all its represented issues. It would be appreciated that for rejected issues, the technique learns the feedback and does not extract same issues from those descriptions ever. Further, the accepted issues are then moved to the service catalog, so that they can be identified in the first stage and kept away from getting user feedback in the rerun. It rewards the techniques that have higher acceptance ratio and punishes the techniques with higher rejection ratio by increasing/decreasing the weights of their parameters.

Referring FIG. 2, to illustrate a flowchart (200) for issue extraction from trouble tickets using a multi-pronged approach. An algorithm of algorithms (AoA) layer approach is used for extracting issues from trouble ticket descriptions. Machine and user generated tickets are identified based on number of clusters, inter-cluster and intra-cluster distance, language variations, Part of Speech (PoS) tagging, sentence correctness and completeness and non-dictionary terms present (202). A relevant technique is selected for machine and user generated tickets based on ticket data properties, historical performance, and user feedback (204). The ticket description is matched with a service catalog to identify right mix of columns from the service catalog (206). The identified right mix of columns from the service catalog is used for matching based on the presence of weighted keywords in the input data and identifies the high-weighted keywords from input data descriptions and compares them with selected columns from catalog to generate accurate matches with their similarity score.

Further, the identified ticket description is labelled using a text similarity based extraction (208). The labelling helps in identifying patterns of the ticket descriptions by understanding parameters and jargons from the tickets, cluster ambiguous and verbose user generated descriptions using vectorization by decoding semantics of issues, performing iteratively the below steps until category of issues are extracted from the descriptions. Furthermore, the labelled machine generated ticket descriptions and user generated ticket descriptions are aggregated to obtain ticket descriptions with labels or without labels (210). User feedback is received for each labelled machine generated ticket descriptions and user generated ticket descriptions to obtain a representative set of labelled or unlabeled ticket descriptions (212) and learning the issues of ticket descriptions from the representative set of labelled or unlabeled ticket descriptions (214).

Referring FIG. 3, to illustrate a processor-implemented method (300) for extraction of issues from trouble tickets. Herein, the method identifies the type of trouble ticket whether it is machine generated or user generated trouble tickets and accordingly selects the appropriate technique for issue extraction.

Initially, at the step (302), receiving, via an input/output interface, a plurality of trouble tickets representing one or more information technology (IT) related issues. The plurality of trouble tickets comprising a machine generated and a user generated trouble tickets.

At the next step (304), inferring description of the machine generated, and the user generated trouble tickets based on language variations, Part of Speech (PoS) tagging, sentence correctness and completeness, and presence of non-dictionary terms.

At the next step (306), identifying patterns of the trouble ticket descriptions of the plurality of trouble tickets by understanding domain-specific parameters from the plurality of trouble tickets.

At the next step (308), clustering the machine generated, and the user generated trouble tickets separately based on the identified patterns of the trouble ticket descriptions of machine generated trouble tickets.

At the next step (310), selecting one or more techniques for the machine generated and user generated trouble tickets based on data properties, historical performance, and user feedback on each of the plurality of trouble tickets. The one or more techniques comprising a pattern matching technique, a text similarity matching technique, and a keyword frequency based matching technique.

At the next step (312), identifying one or more columns from a predefined service catalog based on the pattern matching technique. The service catalog comprising one or more annotated issues.

At the next step (314), comparing description of the plurality of the trouble tickets having weighted keywords with the identified one or more columns from the service catalog for matching with a similarity score. It identifies the right mix of columns from the service catalog to be used for matching based on the presence of weighted keywords in the input data and identifies the high-weighted keywords from input data descriptions and compares them with selected columns from catalog to generate accurate matches with their similarity score.

At the next step (316), labelling descriptions of the machine generated trouble tickets using the text similarity matching technique based extraction. It identifies patterns of the trouble ticket descriptions of machine generated trouble tickets by understanding domain-specific parameters from the trouble tickets, creates cluster of similar descriptions using intra-cluster distance, inter-cluster distance and degree of closeness, selects a cluster with highest quality by assessing each cluster with its similarity score, and creates cluster labels by selecting weighted n-grams from descriptions within each cluster.

In other aspect, the method includes identifying and labelling trouble ticket descriptions in user generated trouble tickets using keyword-discovery based extraction. It identifies patterns of the trouble ticket descriptions by understanding parameters and jargons from the trouble tickets, cluster ambiguous and verbose user generated descriptions using vectorization by decoding semantics of issues, performing iteratively the below steps until category of issues are extracted from the descriptions.

At the next step (318), aggregating the labelled descriptions of the machine generated trouble ticket and the descriptions of the user generated trouble tickets to obtain trouble ticket descriptions with labels or without labels. The user feedback is received for each labelled machine generated trouble ticket descriptions and user generated trouble ticket descriptions to obtain a representative set of labelled or unlabeled trouble ticket descriptions.

At the last step (320), learning one or more issues of the machine generated trouble tickets from the obtained trouble ticket descriptions with labels. It extrapolates the feedback of each representative issue on all its represented issues. For rejected issues, the technique remembers the feedback and does not extract same issues from those descriptions ever and accepted issues are then moved to the service catalog, so that they can be identified in the first stage and kept away from getting user feedback in the rerun. It rewards the techniques that have higher acceptance ratio and punishes the techniques with higher rejection ratio by increasing/decreasing the weights of their parameters.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem associated with extracting issues based on trouble ticket mining. Trouble tickets generated by alerting tools are standardized in their structure, but they contain technical jargon and are not well-formed English sentences and are heavily parameterized. Trouble tickets generated by humans are non-standardized, redundant, ambiguous, have typos, and at times are verbose. The embodiments herein present a solution to this problem using various text-matching techniques. The embodiments herein solve this problem by developing a weighted set matching technique. The system and method perform text-cleaning to remove parameter variations and lemmatization to address various inflected forms of words. The system and method then do a weighted text matching to look for the presence of a catalog entry or its variations in the description. The matching is done such that more weight is assigned to the key actions and object terms, and their sequence.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g., any kind of computer like a server or a personal computer, or the like, or any combination thereof. The device may also include means which could be e.g., hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purpose of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:
   receiving, via an input/output interface, a plurality of trouble tickets representing one or more information technology (IT) related issues, wherein the plurality of trouble tickets comprising a machine generated and a user generated trouble tickets;
   inferring, via the one or more hardware processors, description of the machine generated, and the user generated trouble tickets based on language variations, Part of Speech (POS) tagging, sentence correctness and completeness, and presence of non-dictionary terms;
   identifying, via the one or more hardware processors, patterns of the trouble ticket descriptions of the plurality of trouble tickets by understanding domain-specific parameters from the plurality of trouble tickets and identify patterns of the trouble ticket descriptions in the user generated trouble tickets by understanding jargons from the trouble tickets, cluster ambiguous and verbose user generated descriptions using vectorization by decoding semantics of issues;
   clustering, via the one or more hardware processors, the machine generated, and the user generated trouble tickets separately based on the identified patterns of the trouble ticket descriptions of machine generated trouble tickets and further extract issues from the ticket descriptions by identifying top k-gram keywords within each cluster and creating a sub-cluster of all those descriptions having those top k-grams keywords, systematically choses an optimum 'k' value by following a k vs cluster-size matrix and continue performing these steps iteratively until issues are extracted from the trouble ticket descriptions;
   selecting, via the one or more hardware processors, one or more techniques for the machine generated and user generated trouble tickets based on data properties, historical performance, and user feedback on each of the plurality of trouble tickets, wherein the one or more techniques comprising a pattern matching technique, a text similarity matching technique, and a keyword frequency based matching technique;
   identifying, via the one or more hardware processors, one or more columns from a predefined service catalog based on the pattern matching technique, wherein the service catalog comprising one or more annotated issues;
   comparing, via the one or more hardware processors, description of the plurality of the trouble tickets having weighted keywords with the identified one or more columns from the service catalog for matching with a similarity score;
   labelling, via the one or more hardware processors, descriptions of the machine generated trouble tickets using the text similarity matching technique based extraction;
   aggregating, via the one or more hardware processors, the labelled descriptions of the machine generated trouble ticket and the descriptions of the user generated trouble tickets to obtain trouble ticket descriptions with labels or without labels; and
   learning, via the one or more hardware processors, one or more issues of the machine generated trouble tickets from the obtained trouble ticket descriptions with labels.

2. The processor-implemented method of claim 1, further comprising:
   identifying, via the one or more hardware processors, patterns of the trouble ticket descriptions of the machine generated trouble tickets by understanding domain-specific parameters from the trouble tickets;
   creating, via the one or more hardware processors, one or more clusters of similar descriptions using an intra-cluster distance, an inter-cluster distance and a degree of closeness; and
   creating, via the one or more hardware processors, cluster labels by selecting weighted n-grams from descriptions within each of the one or more created clusters.

3. The processor-implemented method of claim 1, wherein the mining n-grams of the user generated trouble tickets as keywords and nested keyword to group similar descriptions and provide a label to them.

4. The processor-implemented method of claim 1, wherein a text-cleaning to remove parameter variations, and a lemmatization to address various inflected forms of words from the user generated trouble tickets.

5. The processor-implemented method of claim 1, wherein a weighted text matching to look for the presence of a catalog entry or its variations in the descriptions of the trouble tickets.

6. The processor-implemented method of claim 1, wherein the user feedback is received for each labelled machine generated trouble ticket descriptions and user generated trouble ticket descriptions to obtain a representative set of labelled or unlabeled trouble ticket descriptions.

7. The processor-implemented method of claim 1, wherein, for rejected issues, the techniques learns the user feedback and does not extract same issues from the ticket descriptions in the user feedback, and accepted issues in the user feedback are moved to the service catalog to identify the accepted issues first and kept away from getting the user feedback in rerun.

8. A system comprising:
an input/output interface to receive a plurality of trouble tickets representing one or more information technology (IT) related issues, wherein the plurality of trouble tickets comprising a machine generated and a user generated trouble tickets;
one or more hardware processors;
a memory in communication with the one or more hardware processors, wherein the one or more hardware processors are configured to execute programmed instructions stored in the memory, to:
infer description of the machine generated, and the user generated trouble tickets based on language variations, Part of Speech (POS) tagging, sentence correctness and completeness, and presence of non-dictionary terms;
identify patterns of the trouble ticket descriptions of the plurality of trouble tickets by understanding domain-specific parameters from the plurality of trouble tickets and identify patterns of the trouble ticket descriptions in the user generated trouble tickets by understanding jargons from the trouble tickets, cluster ambiguous and verbose user generated descriptions using vectorization by decoding semantics of issues;
cluster the machine generated, and the user generated trouble tickets separately based on the identified patterns of the trouble ticket descriptions of machine generated trouble tickets and further extract issues from the ticket descriptions by identifying top k-gram keywords within each cluster and creating a sub-cluster of all those descriptions having those top k-grams keywords, systematically choses an optimum 'k' value by following a k vs cluster-size matrix and continue performing these steps iteratively until issues are extracted from the trouble ticket descriptions;
select, one or more techniques for the machine generated and user generated trouble tickets based on data properties, historical performance, and user feedback on each of the plurality of trouble tickets, wherein the one or more techniques comprising a pattern matching technique, a text similarity matching technique, and a keyword frequency based matching technique;
identify one or more columns from a predefined service catalog based on the pattern matching technique, wherein the service catalog comprising one or more annotated issues;
compare description of the plurality of the trouble tickets having weighted keywords with the identified one or more columns from the service catalog for matching with a similarity score;
label descriptions of the machine generated trouble tickets using the text similarity matching technique based extraction;
aggregate the labelled descriptions of the machine generated trouble ticket and the descriptions of the user generated trouble tickets to obtain trouble ticket descriptions with labels or without labels; and
learn one or more issues of the machine generated trouble tickets from the obtained trouble ticket descriptions with labels.

9. The system of claim 8, further comprising:
identify patterns of the trouble ticket descriptions of the machine generated trouble tickets by understanding domain-specific parameters from the trouble tickets;
create one or more clusters of similar descriptions using an intra-cluster distance, an inter-cluster distance and a degree of closeness; and
create cluster labels by selecting weighted n-grams from descriptions within each cluster.

10. The system of claim 8, wherein mining n-grams of the user generated trouble tickets as keywords and nested keywords to group similar descriptions and provide a label to them.

11. The system of claim 8, wherein a text-cleaning to remove parameter variations and a lemmatization to address various inflected forms of words from the user generated trouble tickets.

12. The system of claim 8, wherein a weighted text matching to look for presence of a catalog entry or its variations in the descriptions of the trouble tickets.

13. The system of claim 8, wherein, for rejected issues, the techniques learns the user feedback and does not extract same issues from the ticket descriptions in the user feedback, and accepted issues in the user feedback are moved to the service catalog to identify the accepted issues first and kept away from getting the user feedback in rerun.

14. A non-transitory computer readable medium storing one or more instructions which when executed by one or more processors on a system, cause the one or more processors to perform a method comprising:
receiving, via an input/output interface, a plurality of trouble tickets representing one or more information technology (IT) related issues, wherein the plurality of trouble tickets comprising a machine generated and a user generated trouble tickets;
inferring, via the one or more hardware processors, description of the machine generated, and the user generated trouble tickets based on language variations, Part of Speech (PoS) tagging, sentence correctness and completeness, and presence of non-dictionary terms;
identifying, via the one or more hardware processors, patterns of the trouble ticket descriptions of the plurality of trouble tickets by understanding domain-specific parameters from the plurality of trouble tickets and identify patterns of the trouble ticket descriptions in the user generated trouble tickets by understanding jargons from the trouble tickets, cluster ambiguous and verbose user generated descriptions using vectorization by decoding semantics of issues;
clustering, via the one or more hardware processors, the machine generated, and the user generated trouble tickets separately based on the identified patterns of the trouble ticket descriptions of machine generated trouble tickets and further extract issues from the ticket descriptions by identifying top k-gram keywords within each cluster and creating a sub-cluster of all those descriptions having those top k-grams keywords, systematically choses an optimum 'k' value by following a k vs cluster size matrix and continue performing these steps iteratively until issues are extracted from the trouble ticket descriptions;

selecting, via the one or more hardware processors, one or more techniques for the machine generated and user generated trouble tickets based on data properties, historical performance, and user feedback on each of the plurality of trouble tickets, wherein the one or more techniques comprising a pattern matching technique, a text similarity matching technique, and a keyword frequency based matching technique;

identifying, via the one or more hardware processors, one or more columns from a predefined service catalog based on the pattern matching technique, wherein the service catalog comprising one or more annotated issues;

comparing, via the one or more hardware processors, description of the plurality of the trouble tickets having weighted keywords with the identified one or more columns from the service catalog for matching with a similarity score;

labelling, via the one or more hardware processors, descriptions of the machine generated trouble tickets using the text similarity matching technique based extraction;

aggregating, via the one or more hardware processors, the labelled descriptions of the machine generated trouble ticket and the descriptions of the user generated trouble tickets to obtain trouble ticket descriptions with labels or without labels; and learning, via the one or more hardware processors, one or more issues of the machine generated trouble tickets from the obtained trouble ticket descriptions with labels.

15. The one or more non-transitory machine-readable information storage mediums of claim 14, wherein, for rejected issues, the techniques learns the user feedback and does not extract same issues from the ticket descriptions in the user feedback, and accepted issues in the user feedback are moved to the service catalog to identify the accepted issues first and kept away from getting the user feedback in rerun.

* * * * *